United States Patent
Hawk et al.

(10) Patent No.: US 11,598,087 B2
(45) Date of Patent: Mar. 7, 2023

(54) SOUND DAMPING WALLBOARD AND METHOD OF CONSTRUCTING A SOUND DAMPING WALLBOARD

(71) Applicant: National Gypsum Properties, LLC, Charlotte, NC (US)

(72) Inventors: Jeff Hawk, Mitchell, IN (US); Tommy Wilson, Rock Hill, SC (US); Michael N. Blades, Indian Land, SC (US); Joseph J. Bailey, Charlotte, NC (US); Brian G. Randall, Charlotte, NC (US)

(73) Assignee: Gold Bond Building Products, LLC, Charlotte, NC (US)

( * ) Notice: Subject to any disclaimer, the term of this patent is extended or adjusted under 35 U.S.C. 154(b) by 911 days.

(21) Appl. No.: 15/995,348

(22) Filed: Jun. 1, 2018

(65) Prior Publication Data

US 2018/0347182 A1    Dec. 6, 2018

Related U.S. Application Data

(60) Provisional application No. 62/514,822, filed on Jun. 3, 2017.

(51) Int. Cl.
| | |
|---|---|
| *E04B 1/84* | (2006.01) |
| *E04B 1/86* | (2006.01) |
| *G10K 11/168* | (2006.01) |
| *C01F 11/46* | (2006.01) |
| *E04C 2/04* | (2006.01) |
| *E04B 2/74* | (2006.01) |

(Continued)

(52) U.S. Cl.
CPC ............... *E04B 1/8409* (2013.01); *E04B 1/86* (2013.01); *E04B 2/7409* (2013.01); *E04C 2/043* (2013.01); *E04C 2/288* (2013.01); *G10K 11/168* (2013.01); *B32B 9/002* (2013.01); *B32B 2607/00* (2013.01); *C01F 11/46* (2013.01); *E04B 2001/8461* (2013.01)

(58) Field of Classification Search
CPC .. E04B 1/86; E04B 2001/8461; E04B 1/8409; G10K 11/168; C01F 11/46
See application file for complete search history.

(56) References Cited

U.S. PATENT DOCUMENTS

| | | | |
|---|---|---|---|
| 3,350,257 A | * 10/1967 | Hourigan | ................ B28B 11/04 |
| | | | 428/161 |
| 4,317,503 A | * 3/1982 | Soderquist | ................ E04B 1/86 |
| | | | 181/290 |

(Continued)

*Primary Examiner* — Jeremy A Luks
(74) *Attorney, Agent, or Firm* — Dority & Manning, P.A.

(57) ABSTRACT

A sound damping wallboard for installation on an installed wallboard, a sound damping wallboard system, and a method of constructing a sound damping wallboard on a building structure are disclosed. The sound damping wallboard includes a gypsum layer having a gypsum layer inner surface and a gypsum layer outer surface, a first sound damping layer disposed at the gypsum layer inner surface and having a first sound damping layer inner surface opposite the gypsum layer inner surface, a first encasing layer disposed at the gypsum layer outer surface, a second encasing layer disposed at the first sound damping layer inner surface, and a second sound damping layer disposed at the second encasing layer opposite the first sound damping layer inner surface.

19 Claims, 7 Drawing Sheets

(51) Int. Cl.
*E04C 2/288* (2006.01)
*B32B 9/00* (2006.01)

(56) References Cited

U.S. PATENT DOCUMENTS

| | | | | |
|---|---|---|---|---|
| 5,502,931 A * | 4/1996 | Munir | ............... | B32B 7/14 |
| | | | | 52/144 |
| 7,181,891 B2 * | 2/2007 | Surace | ............... | B32B 37/10 |
| | | | | 52/642 |
| 7,799,410 B2 * | 9/2010 | Tinianov | ............... | E04B 1/86 |
| | | | | 428/212 |
| 8,181,738 B2 * | 5/2012 | Tinianov | ............... | E04B 1/942 |
| | | | | 181/290 |
| 8,424,251 B1 * | 4/2013 | Tinianov | ............... | E04B 1/86 |
| | | | | 52/144 |
| 8,627,922 B2 * | 1/2014 | Fournier | ............... | B32B 7/12 |
| | | | | 181/294 |
| 9,512,613 B2 * | 12/2016 | Blades | ............... | B32B 37/14 |
| 9,670,665 B2 * | 6/2017 | Kipp | ............... | E04C 2/043 |
| 2008/0086957 A1 * | 4/2008 | Averill | ............... | B32B 13/08 |
| | | | | 52/144 |
| 2009/0004459 A1 * | 1/2009 | Kipp | ............... | B32B 3/26 |
| | | | | 428/318.4 |
| 2013/0240291 A1 * | 9/2013 | Tinianov | ............... | E04B 1/84 |
| | | | | 181/294 |
| 2015/0068838 A1 * | 3/2015 | Keene | ............... | E04F 15/20 |
| | | | | 181/292 |
| 2015/0075901 A1 * | 3/2015 | Beresowski | ............... | E04B 1/86 |
| | | | | 181/290 |
| 2015/0218804 A1 * | 8/2015 | Payot | ............... | E04B 1/82 |
| | | | | 52/144 |
| 2016/0153187 A1 * | 6/2016 | Desai | ............... | B32B 27/00 |
| | | | | 428/497 |
| 2016/0230395 A1 * | 8/2016 | Cusa | ............... | E04F 13/0875 |

* cited by examiner

SOUND DAMPING WALLBOARD AND METHOD OF CONSTRUCTING A SOUND DAMPING WALLBOARD

CROSS-REFERENCE TO RELATED APPLICATION

The present application claims filing benefit of U.S. Provisional Patent Application Ser. No. 62/514,822 having a filing date of Jun. 3, 2017, and which is incorporated herein by reference in its entirety.

BACKGROUND

A building is typically constructed with walls having a frame comprising vertically oriented studs connected by horizontally oriented top and bottom plates or tracks. The walls often include one or more gypsum wallboards fastened to the studs and/or plates on each side of the frame or, particularly for exterior walls, one or more gypsum wallboards fastened to the studs and/or plates on one side of the frame with a non-gypsum based sheathing attached to an exterior side of the frame. A ceiling of the building may also include one or more gypsum wallboards oriented horizontally and fastened to joists, studs, or other structural members extending horizontally in the building. Walls and ceilings of this construction often have poor acoustical performance and a low sound transmission class (STC) rating, which results in noise pollution, lack of privacy, and similar issues in the various spaces of the building. One of the aspects of this poor performance is the coincidence between the human voice Hertz spectrum and the vibrational Hertz range of standard gypsum wallboard, which creates a unique dip in the acoustical curve of a standard frame and gypsum wallboard wall.

One method to improve acoustical performance of the walls and ceilings is to install insulation in the cavities of the walls before attaching wallboards to the wall frame. Other methods include the use of rubber sheets, clips, or panels attached to the frame during wall or ceiling construction. However, most of the current methods to improve wall or ceiling acoustical performance must be implemented during the initial wall or ceiling construction, and these conventional methods do not overcome the coincidence issue of standard gypsum wallboard discussed above. Further, the resulting wall may be significantly thicker than traditionally-constructed walls due to the addition of the sound damping materials.

Therefore, there exists a need for a sound damping wallboard that is structured for retrofit installation and attachment to a wallboard or other panel of wall material previously installed onto the frame of a wall to improve the acoustical performance of the wall and, in particular, help address any coincidence issues. Further, there exists a need for a sound damping wallboard for attachment to an installed wallboard or wall panel whereby the sound damping wallboard is sufficiently thin to minimize the skill and labor needed for installation, minimize the increase in overall wall thickness, avoid costly and labor-intensive modifications to installed wall and ceiling objects, such as existing wall outlets, switches, and wall or ceiling fixtures, and minimize any reduction in living space within the structure causing a reduction in the value of the structure.

SUMMARY OF THE INVENTION

In accordance with one embodiment of the present invention, a sound damping wallboard is disclosed. The wallboard includes: a gypsum layer having a gypsum layer surface; a first sound damping layer disposed at the gypsum layer surface and having a first sound damping layer surface opposite the gypsum layer; and a second sound damping layer disposed at the first sound damping layer surface.

In accordance with another embodiment of the present invention, a sound damping wallboard is disclosed. The wallboard includes: a gypsum layer having a gypsum layer surface; a first encasing layer disposed on the gypsum layer surface; a first sound damping layer positioned on the first encasing layer and having a first sound damping layer surface opposite the gypsum layer; a second encasing layer disposed on the first sound damping layer surface; a second sound damping layer positioned on the second encasing layer and having a second sound damping layer surface opposite the first sound damping layer; and a third encasing layer disposed on the second sound damping layer surface.

In accordance with another embodiment of the present invention, a method of installing a sound damping wallboard on installed wallboard is disclosed. The method comprises attaching the sound damping wallboard onto the installed wallboard wherein a first sound damping layer is positioned between a gypsum layer of the sound damping wallboard and the installed wallboard.

In accordance with another embodiment of the present invention, a method of forming a sound damping wallboard is disclosed. The method comprises: forming a gypsum layer having a gypsum layer inner surface; providing a first sound damping layer at the gypsum layer inner surface wherein the first sound damping layer has a first sound damping layer inner surface opposite the gypsum layer inner surface; and providing a second sound damping layer at the first sound damping layer inner surface wherein the second sound damping layer has a second sound damping layer inner surface opposite the first sound damping layer inner surface.

BRIEF DESCRIPTION OF THE FIGURES

The embodiments described herein and other features, advantages, and disclosures contained herein, and the manner of attaining them, will be better understood from the following description in conjunction with the accompanying drawing figures, in which like reference numerals identify like elements, and wherein.

DETAILED DESCRIPTION

Figure 1:
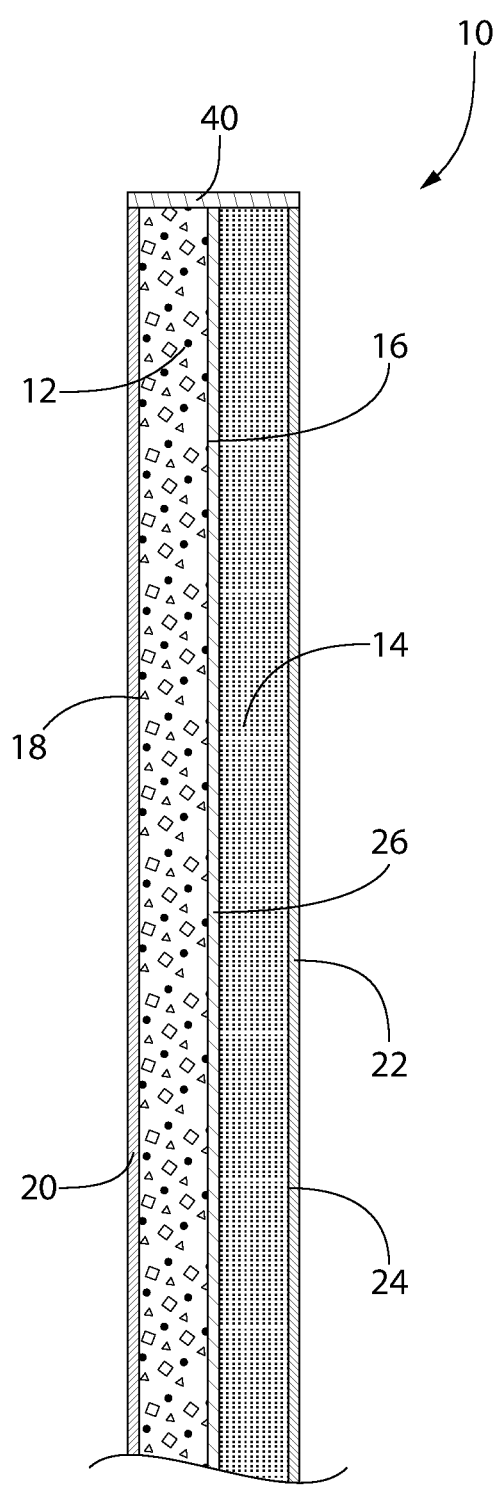
FIG. 1 is a cross sectional view of a sound damping wallboard in accordance with aspects of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally speaking, the present invention is directed to a sound damping wallboard comprising a gypsum layer and multiple sound damping layers. For instance, the sound damping wallboard may contain at least two sound damping layers. The present inventors have discovered that wallboards containing such sound damping layers can have various benefits. In particular, such wallboards can be effective in improving the acoustical performance of the wallboard thereby minimizing the transmission of noise through a wall containing such wallboards.

For instance, in comparison to conventional wallboard, in particular an existing, installed wallboard without a sound damping layer, the sound damping wallboard as disclosed herein would exhibit a sound transmission loss of 5% or more, such as 10% or more, such as 15% or more, such as 20% or more, such as 25% or more, such as 30% or more, such as 35% or more, such as 40% or more, such as 45% or more, such as 50% or more and less than 100%, such as less than 90%, such as less than 80%, such as 70% or less, such as 60% or less in comparison to the conventional wallboard without a sound damping layer. Such comparison may be at any frequency and in particular at a frequency of 100 Hz or more, such as 125 Hz or more, such as 500 Hz or more, such as 1000 Hz or more, such as 2000 Hz or more, such as 2500 Hz or more, such as 3150 Hz or more, such as 4000 Hz or more. In particular, such comparison may be at 100 Hz, such as 125 Hz, such as at 500 Hz, such as at 1000 Hz, such as at 2000 Hz, such as at 2500 Hz, such as at 3150 Hz, such as at 4000 Hz. In addition, such comparison may be at any 2, such as at any 3, such as at any 4, such as at any 5 of the aforementioned frequencies.

In general, the present invention is directed to a sound damping wallboard. The sound damping layer includes at least one gypsum layer and at least one sound damping layer. In one embodiment, the wallboard includes at least two sound damping layers.

Generally, the gypsum layer includes a gypsum layer surface. A first sound damping layer may be disposed at the gypsum layer surface, such as the gypsum layer inner surface. The gypsum layer also includes a gypsum layer outer surface opposite the gypsum layer inner surface. The first sound damping layer may have a first sound damping layer surface opposite the gypsum layer; this first sound damping layer surface may also be referred to as the first sound damping layer inner surface. In this regard, the first sound damping layer may have a first sound damping layer outer surface opposite the inner surface. The first sound damping layer outer surface may be positioned adjacent the gypsum layer surface, such as the gypsum layer inner surface.

When a second sound damping layer is present, the second sound damping layer may be disposed at the first sound damping layer surface, such as the first sound damping layer inner surface. The second sound damping layer may have a second sound damping layer surface opposite the first sound damping layer inner surface; this second sound damping layer surface may also be referred to as the second sound damping layer inner surface. In this regard, the second sound damping layer may have a second sound damping layer outer surface opposite the inner surface. The second sound damping layer outer surface may be positioned adjacent the first sound damping layer surface, such as the first sound damping layer inner surface.

In addition to the above, encasing layers may be employed in the wallboard. The encasing layer may be included at various positions. For instance, an encasing layer may be positioned on the gypsum layer outer surface. An encasing layer may be positioned at the gypsum layer inner surface. In one embodiment, an encasing layer may be positioned at the gypsum layer inner surface and the gypsum layer outer surface. When the encasing layer is present at the gypsum layer inner surface, the first sound damping layer may be positioned or disposed on the encasing layer.

Also, an encasing layer may be positioned on the first sound damping inner surface. When the encasing layer is present at the first sound damping layer inner surface, the second sound damping layer may be positioned or disposed on the encasing layer. In addition, an encasing layer may be positioned on the second sound damping layer outer surface.

In addition to being present on the major surfaces, the encasing layers may also be present on edges. For instance, the encasing layer may also be present on an edge of the wallboard wherein the encasing layer connects respective layers and/or encasing layers. For instance, the edge encasing layer may connect the edges of a gypsum layer and a first sound damping layer. When an encasing layer is positioned between the gypsum layer and the first sound damping layer, the edge encasing layer may also connect such encasing layer to the gypsum layer and first sound damping layer. When a second sound damping layer is present, an edge encasing layer may connect the gypsum layer, the first sound damping layer, and the second sound damping layer. When an encasing layer is positioned between the first sound damping layer and the second sound damping layer, an edge encasing layer may also connect such encasing layer to the gypsum layer, the first sound damping layer, and the second sound damping layer.

In addition, the sound damping layers may be any as generally employed in the art and are not necessarily limited by the present invention. For instance, the sound damping layer may comprise a resin or polymeric material, and preferably an elastomer. Suitable sound damping materials include, as non-limiting examples, synthetic resins, polymers and copolymers, and latex polymers as are known in the art. In a preferred embodiment, the sound damping material is an acrylic polymer or copolymer. One such non-limiting example is Acronal®, an acrylate copolymer commercially available from BASF (Charlotte, N.C.). The sound damping material may also comprise various additives, including anti-microbial materials for fungal protection and appropriate fillers such as, in non-limiting examples, vermiculite, expanded mica, talc, lead, and granulated polystyrene aluminum oxide. Additional embodiments include a tacky adhesive constructed of one or more polymers having fluidity at an ordinary temperature and one or more emulsion type or solvent type polymers consisting of one or more natural rubbers, synthetic rubbers, and polymers such as, in non-limiting examples, acrylic resin and silicone resin. A tackifier, including such non-limiting examples as petroleum resin and sap, a softener, and/or a plasticizer are included in the sound damping layer in one or more embodiments of the present disclosure. Other non-limiting examples of materials used to form the sound damping layer include polyester resins, resins constructed from plasticizers or peroxide being added to polyester, multiple polyesters, polyurethane foam, polyamide resin, ethylene-vinyl acetate copolymers, ethylene acrylic acid copolymers, polyurethane copolymers, and EPDM polymers. In one or more embodiments, the sound damping layer comprises a polymer having a dynamic glass transition temperature at or below the working temperature at which the sound damping layer will be used.

In this regard, in one embodiment, the sound damping material may be provided as a glue, such as a viscoelastic glue. Once applied, the sound damping material may be dried in order to form the sound damping layer. Such viscoelastic glue is distinguishable from a polymeric sheet that is simply positioned and may not require any drying to provide a sound damping effect.

It should be understood that the first sound damping layer and the second sound damping layer may comprise different materials. In one embodiment, however, the sound damping layer may comprise the same materials. Also, it should be understood that the sound damping layer may comprise the same materials but have different thicknesses. In one embodiment, the sound damping layer may comprise the same materials and have the same thicknesses. In a further embodiment, the sound damping layers may comprise different materials and have the same thicknesses. Alternatively, the sound damping layers may comprise different materials and have different thicknesses. In addition to the above, the sound damping layers may include sound damping materials having different densities.

In one embodiment, the sound damping layers may include the same materials but include different additives. For instance, such different additives may provide different sound damping effects and performance. For instance, with respect to such additives, one may have a higher density than the other additive. These additives may include, but are not limited to, microspheres (e.g., hollow microspheres, filled microspheres), glass spheres, cenospheres, waste materials, minerals (e.g., high density, low density), metals, etc. In this regard, when multiple sound damping layers are employed, the layers may include at least one same sound damping material, such as the same polymer. However, in one embodiment, the layers may include additives having different densities.

With regards to thicknesses, the sound damping material may be divided evenly between multiple sound damping layers having the same thickness. Thus, sound damping wallboards with multiple sound damping layers may have approximately the same thickness as a conventional sound damping wallboard with a single sound damping layer.

Also, where the sound damping layers comprise different materials, have different densities, and/or have different thicknesses, the sound damping layers and materials may be selected to have different, complementary sound damping properties to enhance the performance of the wallboard compared to a single uniform sound damping layer or multiple sound damping layers comprising the same sound damping material (and for instance with the same thicknesses and densities).

When disposed, the sound damping layer may partially or entirely cover the respective surface or layer on which it is disposed or positioned. In one embodiment, the sound damping layer covers the entire surface or layer. In another embodiment, the sound damping layer only partially covers the entire surface or layer.

In addition, the sound damping layer may be a monolithic, homogeneous layer. Also, the sound damping layer may be provided in the form of an adhesive or glue such that drying may be required in order to form the sound damping layer. For instance, the sound damping layer may be formed from a precursor solution including any polymers as mentioned herein wherein the precursor solution is dried to form the sound damping layer.

In addition, the encasing layers may be any as generally employed in the art and are not necessarily limited by the present invention. Suitable materials include paper, fiberglass, foil (e.g., aluminum foil), polymers (e.g., high density polyethylene) and other materials known in the art, as previously described. In one embodiment, the encasing layer includes paper. In one particular embodiment, all of the encasing layers include paper.

In one embodiment, one or more encasing layer(s) may comprise a coating, such as a curable acrylic polymer or copolymer composition, as previously described with respect to the sound damping layers. In one embodiment, the encasing layer(s) may be made of a low emittance or reflective material, or from virgin or recycled material. In another embodiment, the encasing layer may be laminate such that it is constructed from a plurality of thin sheets of material having various thicknesses, each sheet having a thickness less than or equal to 0.001 inches. In one or more embodiments, each of the plurality of thin sheets of material has thickness of 15 microns or less, such as 10 microns or less.

In one embodiment, an encasing layer, such as an exterior encasing layer, may be constructed of or include a release sheet or carrier sheet. For instance, such release sheet or carrier sheet may be a "peel & stick" layer where the release sheet or carrier sheet may be removed during the wallboard manufacturing or installation process leaving behind the exposed sound damping layer. The release sheet or carrier sheet may comprise a plastic film or paper sheet with a release coating, such as a silicone coating, as are known in the art. In this regard, such encasing layer and corresponding sheet can be removable prior to installation.

In one embodiment, the encasing layer, such as an exterior encasing layer (e.g., encasing layer on the first sound damping layer inner surface and/or second sound damping layer inner surface), may comprise a coating that is applied to the respective sound damping layer inner surface. The coating may be applied by various means known in the art, such as spraying or brushing. In a preferred embodiment, the coating is a curable composition that is applied to the sound damping layer inner surface and then cured to form the encasing layer. Suitable coatings include curable polymer compositions, such as acrylic polymer and copolymer compositions. In a preferred embodiment, the coating includes thermal or photo (e.g., UV) curing agents to facilitate curing of the encasing layer. In this regard, in one embodiment, the encasing layer is a thermally cured encasing layer. In another embodiment, the encasing layer is a photocured encasing layer.

In addition, the encasing layer may partially or entirely cover the respective surface or layer on which it is disposed or positioned. In one embodiment, the encasing layer covers the entire surface or layer. In another embodiment, the encasing layer only partially covers the entire surface or layer. When the encasing layer only partially covers the entire surface or layer, the sound damping layer may be provided such that it is only on such partial encasing layer. Alternatively, the sound damping layer may be provided such that it is on the partial encasing layer as well as on the surface or layer on which the encasing layer is positioned. For instance, if the encasing layer positioned between the gypsum layer and the first sound damping layer is a partial encasing layer, the first sound damping layer may be positioned or applied on the partial encasing layer and the gypsum layer.

In addition to any of the aforementioned advantages, the present inventors have discovered several other advantages to using multiple sound damping layers. The present inventors have surprisingly found that the use of multiple sound damping layers substantially reduces imperfections in the encasing layers. In some cases, the encasing layers may experience cockling, warp, buckle, form bubbles or have other surface imperfections from contact with the sound damping layer—e.g., from wetting and/or expansion of the encasing layer after absorption of solvents or other liquid or fluid components of the sound damping material, or from changes in the sound damping layer over time, such as shrinkage from drying or curing. The imperfections in the encasing layer generally do not affect the properties or appearance of the installed wallboard. The sound damping wallboard is typically installed with the sound damping layer(s) positioned proximal or adjacent to an existing wall, ceiling or other building structure. Thus, any imperfections in the encasing layer will be concealed after installation of the sound damping wallboard. Nonetheless, the imperfections in the encasing layer can be aesthetically unappealing and may be misunderstood to suggest that the wallboard is damaged or defective. These imperfections are substantially reduced by the use of multiple sound damping layers.

In addition to the above, the sound damping wallboard may be installed on an existing or installed wallboard. As used in the present disclosure, the term "wallboard," generally refers to any panel, sheet, or planar structure, either uniform or formed by connected portions or pieces, that is constructed to at least partially establish one or more physical boundaries. Such existing, installed, or otherwise established or installed wall or ceiling structures comprise materials that may include, as non-limiting examples, gypsum, stone, ceramic, cement, wood, composite, or metal materials. The installed wallboard forms part of a building structure, such as a wall or ceiling. The installation of the sound damping wallboard as disclosed herein can provide a desired acoustical performance to an existing or installed wallboard that does not have any sound damping capabilities or ineffective sound damping abilities.

The sound damping wallboard, and in particular the gypsum layer, may have a particular thickness. For instance, in one embodiment, the gypsum layer may have a thickness of less than or equal to ⅝ inches, such as less than or equal to ½ inch, such as less than or equal to ⅜ inches, such as less than or equal to 5/16 inches, such as less than or equal to ¼ inches. In one embodiment, the gypsum layer thickness is ⅝ inches. In another embodiment, the gypsum layer thickness is ½ inches. In a further embodiment, the gypsum layer thickness is 5/16 inches. In another further embodiment, the gypsum layer thickness is ¼ inches. When the sound damping wallboard is installed on an existing or installed wallboard, such existing or installed wallboard may have a conventional wallboard thickness such as ½ inches or ⅝ inches. In general, the gypsum layer of the sound damping wallboard of the present invention may have a thickness that is less than the thickness of the installed wallboard.

In this regard, the sound damping wallboard according to an embodiment of the present disclosure is sufficiently thin to allow its installation onto a wall or ceiling without substantially increasing an overall wall or ceiling thickness. Further, the sound damping wallboard of the present disclosure is sufficiently thin to avoid significant modifications to installed wall and ceiling objects, such as existing wall or ceiling outlets, switches, or ceiling fixtures, thereby reducing the time, labor, and materials needed to improve existing walls and ceilings by renovating or retrofitting the walls or ceilings with sound damping material.

In addition to the above, the gypsum layer of the sound damping wallboard may have a higher density than conventional gypsum wallboard. For instance, the density of a gypsum layer of a conventional gypsum wallboard is typically between 1300 and 1650 lbs/msf for wallboards of ½ inch thickness and generally between 1750 and 2200 lbs/msf for wallboards of ⅝ inch thickness. The density of wallboard having a thickness of ¼ or 5/16 inches is between 1200 and 1400 lbs/msf. The gypsum layer of the sound damping wallboard of the present disclosure may generally have a higher density than these densities of the gypsum layers of the conventional gypsum wallboards at a certain thickness. For example, in gypsum slurries that contain foam, the higher density may be achieved by manipulating the amount of foam in the gypsum slurry, or by other means known in the art.

In this regard, an existing or installed wallboard may have a gypsum layer with a first density (e.g., a conventional density) and the sound damping wallboard has a gypsum layer with a second density that is greater than the first density of the installed wallboard. The higher density of the sound damping wallboard and the use of building wall structures where the sound damping wallboard and installed wallboard have different densities are believed to contribute to improved sound damping.

The present disclosure is also directed to a method of forming a sound damping wallboard. The method comprises forming or providing a gypsum layer having a gypsum layer inner surface and a gypsum layer outer surface. An encasing layer can be provided at the gypsum layer outer surface. An encasing layer can also be provided at the gypsum layer inner surface. In addition, the method includes applying or providing a first sound damping layer at the gypsum layer inner surface wherein the first sound damping layer includes a first sound damping layer inner surface opposite the gypsum layer inner surface. The first sound damping layer may be applied or provided on an encasing layer positioned on the gypsum layer inner surface. The method may also include providing or encasing the first sound damping layer with an encasing layer disposed or positioned at the first sound damping layer inner surface. In addition, the method also includes applying or providing a second sound damping layer at the first sound damping layer inner surface wherein the second sound damping layer includes a second sound damping layer surface opposite the first sound damping layer inner surface. The second sound damping layer may be applied or provided on an encasing layer positioned on the first sound damping layer inner surface. The method may also include providing or encasing the second sound damping layer with an encasing layer disposed or position at the second sound damping layer inner surface. The method may also include removing the exterior sound damping layer prior to installation of the sound damping wallboard. With two sound damping layers, this encasing layer may be the encasing layer positioned or disposed on the second sound damping layer inner surface.

The present invention may also include a method of constructing a sound damping wallboard by providing a sound damping wallboard as disclosed herein and providing an installed wallboard attached to a building wall or ceiling. The method may also include a further step of attaching or affixing or fastening the sound damping wallboard to the installed wallboard such that the sound damping layer is disposed between the gypsum layer of the sound damping wallboard and the installed wallboard. In one embodiment, the method may also include removing the exterior sound damping layer prior to installation of the sound damping wallboard. With two sound damping layers, this encasing layer may be the encasing layer positioned or disposed on the second sound damping layer inner surface.

The sound damping wallboard of the present invention can be further described according to the embodiments as illustrated in FIGS. 1-7.

Reference is now made to FIG. 1, which shows a sound damping wallboard 10 according to an embodiment of the present disclosure. The sound damping wallboard 10 of an embodiment generally includes a gypsum layer 12 and a sound damping layer 14, that are sandwiched between first and second encasing layers 20 and 22. The gypsum layer 12 includes a gypsum layer inner surface 16 and a gypsum layer outer surface 18. The sound damping layer 14 is disposed at the gypsum layer inner surface 16. The first encasing layer 20 is disposed at the gypsum layer outer surface 18 and the second encasing layer 22 is disposed at a sound damping layer inner surface 24 opposite the gypsum layer inner surface 16. In an embodiment, a third encasing layer 26 is disposed between the gypsum layer 12 and the sound damping layer 14. In an embodiment, the gypsum layer 12 is constructed using conventional gypsum wallboard manufacturing techniques, including encasing the gypsum layer 12 in an encasing material such that an encasing layer is disposed on each of the gypsum layer inner surface 16 and the gypsum layer outer surface 18, thereby forming the first encasing layer 20 and the third encasing layer 26. In an embodiment, the gypsum layer 12 has a higher density than a density of a gypsum layer of a conventional gypsum wallboard.

The sound damping layer 14 may be applied or positioned directly on the gypsum layer 12 or the third encasing layer 26, or both. In one or more embodiments, the sound damping layer 14 is positioned or applied directly on the gypsum layer inner surface 16 as a monolithic, homogenous layer. In an alternative embodiment, the third encasing layer 26 only partially covers the gypsum layer inner surface 16 of the gypsum layer 12 such that the sound damping layer 14 is positioned or applied on both the gypsum layer 12 and the third encasing layer 26. The sound damping layer 14 may cover substantially the entire surface of the gypsum layer 12 or the third encasing layer 26. In yet another embodiment, after the gypsum layer 12 is constructed using traditional gypsum wallboard manufacturing techniques and the sound damping layer 14 is positioned adjacent to or applied onto the gypsum layer 12 or third encasing layer 26, the wallboard 10 may then be encased to at least partially form the first encasing layer 20 and the second encasing layer 22. The first encasing layer 20 may comprise both encasing material from the original encasement of the gypsum layer 12 using traditional gypsum wallboard manufacturing techniques as well as encasing material used to encase the wallboard 10 following the formation of the sound damping layer 14.

As also shown in FIG. 1, the encasement of the gypsum layer 12 and/or the encasement of the sound damping wallboard 10 may include a first edge encasing layer 40 and a second edge encasing layer (not shown) connecting the first encasing layer 20 to the second encasing layer 22 and/or the third encasing layer 26.

Figure 2:
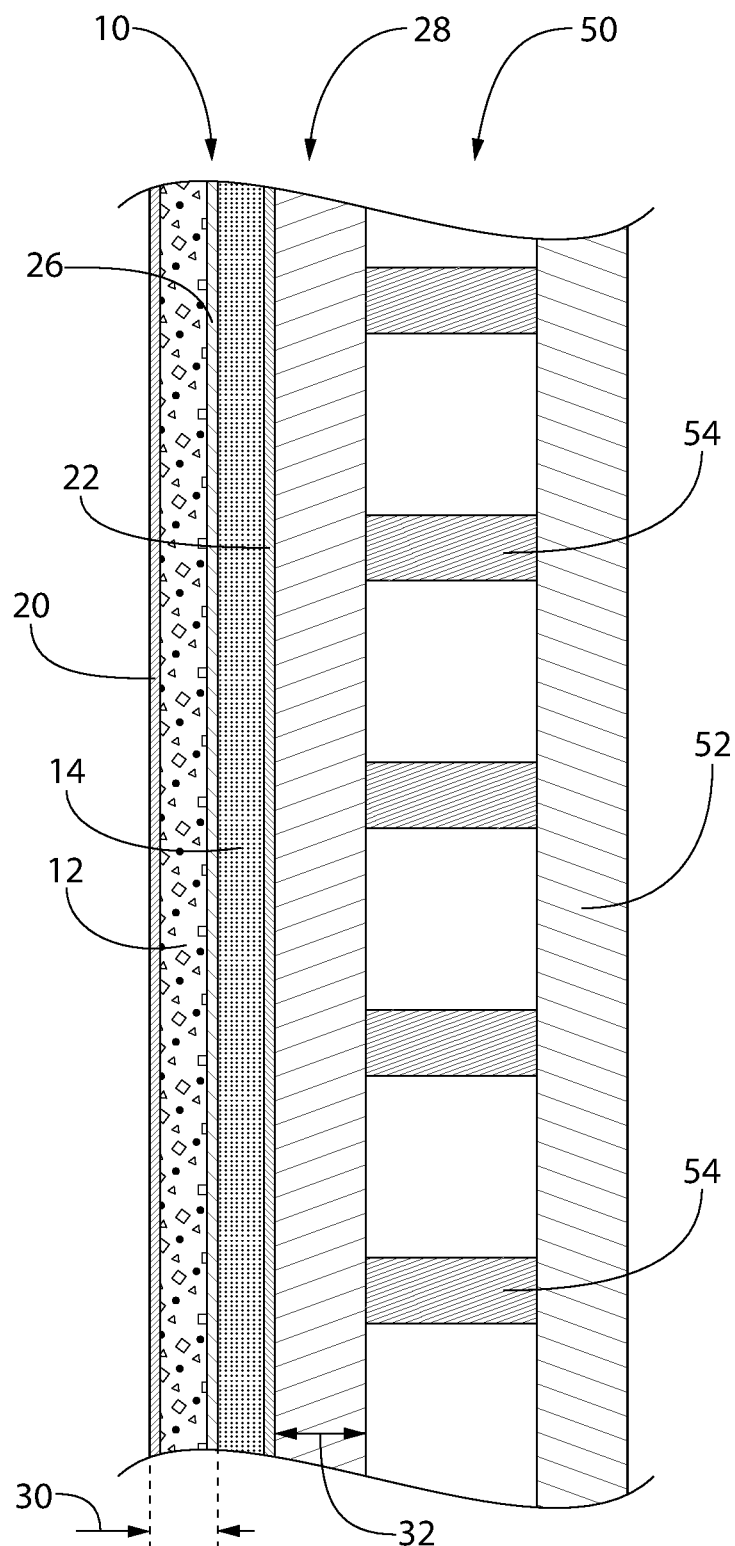
FIG. 2 is a cross sectional view of a sound damping wallboard and installed wallboard in accordance with further aspects of the present disclosure.

Referring now to FIG. 2, an embodiment of the present disclosure includes the sound damping wallboard 10 being installed such that the sound damping layer 14 is disposed between the gypsum layer 12 and an installed wallboard 28. In the embodiment shown in FIG. 2, the building structure is a vertically aligned building wall 50, which optionally has a second installed wallboard 52 connected to an opposite side of the building wall 50. The installed wallboards 28, 52 are connected via one or more studs 54 of a wall frame to form the structure of the building wall 50. One of ordinary skill will recognize the various methods and structures for fastening, adhering, or otherwise attaching or constructing the components of a wall or ceiling, including studs, plates, panels, wallboards, etc., to form a building structure such as a wall or ceiling, and such methods and structures are included in the present disclosure.

According to one or more embodiments, the sound damping wallboard 10 is installed in a flush relationship against the installed wallboard 28 with the sound damping inner layer 24 disposed at the installed wallboard 28, as shown in FIG. 2. The sound damping wallboard 10 is installed against the installed wallboard 28, in one embodiment, by mounting, attaching or otherwise fastening the sound damping wallboard 10 to the installed wallboard 28. For example, the sound damping wallboard 10 may be fastened to the installed wallboard 28 using all-purpose joint compound and fasteners, including such non-limiting examples as nails, screws, and laminating screws. Fastener locations and joints between sound damping wallboards 10 are treated, in an embodiment, using conventional drywall tape and joint compound.

In the embodiment shown in FIG. 2, the second encasing layer 22 remains positioned against the sound damping layer 14 during installation of the sound damping wallboard 10 on the installed wallboard 28. However, if such encasing layer includes a peel & stick layer, the sound damping layer 14 may be positioned against the installed wallboard 28 instead of the second encasing layer 22.

As described above, in one embodiment, the second encasing layer 22 is removable such that the second encasing layer 22 is removed prior to installation of the sound damping wallboard 10 on the installed wallboard 28. In a preferred embodiment, the second encasing layer 22 may comprise an adhesive layer with a release sheet or carrier sheet, such as used in "peel & stick" applications, where the carrier sheet may be removed before the wallboard 10 is fastened to the installed wallboard 28 by contact with the adhesive. In embodiments where the sound damping layer 14 itself comprises a tacky or adhesive material, the second encasing layer 22 may comprise a release sheet without a further adhesive layer. For example, the release sheet may comprise a plastic film or paper sheet with a release coating, such as a silicone coating, as are known in the art.

Figure 3:
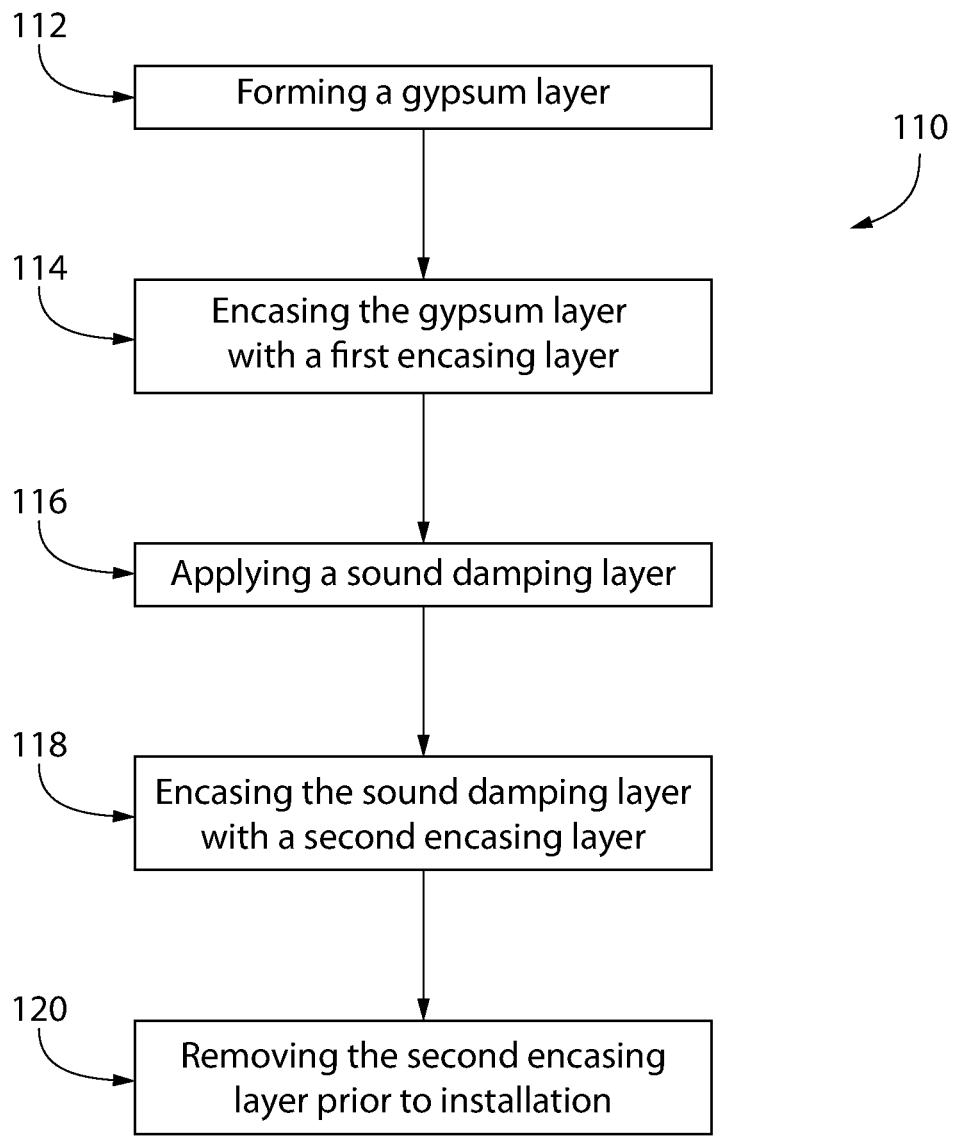
FIG. 3 illustrates a method of forming a sound damping wallboard in accordance with further aspects of the present disclosure.

Referring now to FIG. 3, one or more embodiments of the present disclosure include a method 110 of forming a sound damping wallboard 10 for installation on an installed wallboard 28. In an embodiment, the method 110 includes forming, at step 112, a gypsum layer 12 having a gypsum layer inner surface 16 and a gypsum layer outer surface 18 and encasing, at step 114, the gypsum layer 12 with a first encasing layer 20 disposed at the gypsum layer outer surface 18. In an embodiment, the method 110 further includes encasing the gypsum layer 12 with a third encasing layer 26 disposed at the gypsum layer inner surface 16. The method 110 further includes applying, at step 116, a sound damping layer 14 to the gypsum layer inner surface 16 such that the sound damping layer 14 includes a sound damping layer inner surface 24 opposite the gypsum layer inner surface 16 and encasing, at step 118, the sound damping layer 14 with a second encasing layer 22 disposed at the sound damping layer inner surface 24. The method 110 of one or more embodiments further includes removing, at step 120, the second encasing layer 22 prior to installation of the sound damping wallboard 10 on the installed wallboard 28. In an embodiment, the gypsum layer 12 is formed to a gypsum layer thickness 30 less than an installed wallboard thickness 32. In an embodiment, the gypsum layer 12 is formed to a gypsum layer thickness 30 that is about 5/16 inch or less, and more preferably about 1/4 inch or less. In one or more embodiments, the sound damping layer 14 is comprised of an elastomer material. Any structures, materials, applications, or similar details described in the present disclosure with regard to the sound damping wallboard 10 may be incorporated into one or more embodiments of the method 110.

Figure 4:
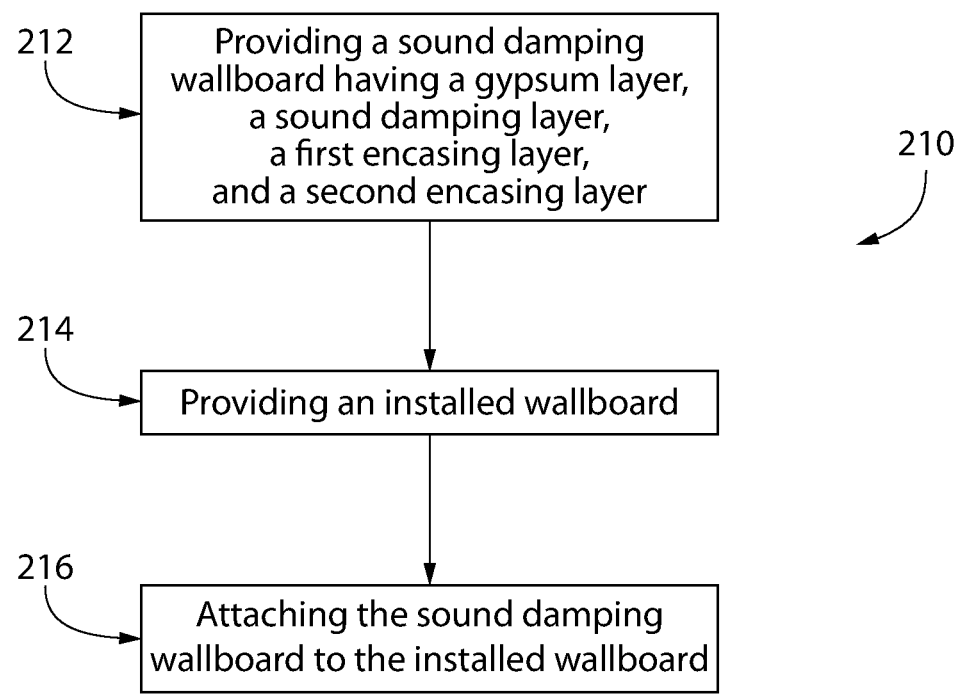
FIG. 4 illustrates a method of constructing a sound damping wall in accordance with further aspects of the present disclosure.

Referring now to FIG. 4, one or more embodiments of the present disclosure include a method 210 of constructing a sound damping wallboard 10. In an embodiment, the method 210 includes providing, at step 212, a sound damping wallboard 10 having a gypsum layer 12, a sound damping layer 14, a first encasing layer 20 disposed adjacent the gypsum layer 12, and a second encasing layer 22 disposed adjacent the sound damping layer 14. The method 210 further includes providing, at step 214, an installed wallboard 28 attached to a building wall or ceiling and attaching, at step 216, the sound damping wallboard 10 to the installed wallboard 28 such that the sound damping layer 14 is disposed between the gypsum layer 12 and the installed wallboard 28. In an embodiment, the method 210 further includes removing the second encasing layer 22 from the sound damping wallboard 10 prior to installing the sound damping wallboard 10 on the installed wallboard 28.

In an embodiment, the first encasing layer 20 is disposed at a gypsum layer outer surface 18 and the second encasing layer 22 is disposed at a sound damping layer inner surface 24. The gypsum layer 12 of an embodiment has a gypsum layer thickness 30, the installed wallboard 28 has an installed wallboard thickness 32, and the gypsum layer thickness 30 is less than the installed wallboard thickness 32. According to an embodiment, the gypsum layer 12 has a gypsum layer thickness 30 that is about 5/16 inch or less, and more preferably about 1/4 inch or less. The sound damping layer 14 of an embodiment is a polymer material, and more preferably an elastomer. Any structures, materials, applications, or similar details described in the present disclosure with regard to the sound damping wallboard 10 may be incorporated into one or more embodiments of the method 210.

The sound damping wallboard 10 according to an embodiment of the present disclosure improves the acoustical performance of an existing, installed, or otherwise established wallboard, wall panel, ceiling panel, or similar structural boundary or surface. One of ordinary skill will recognize the sound damping benefit and applicability of the sound damping wallboard and methods of the present disclosure to the many structures and materials used to form wall and ceiling structures.

Figure 7:
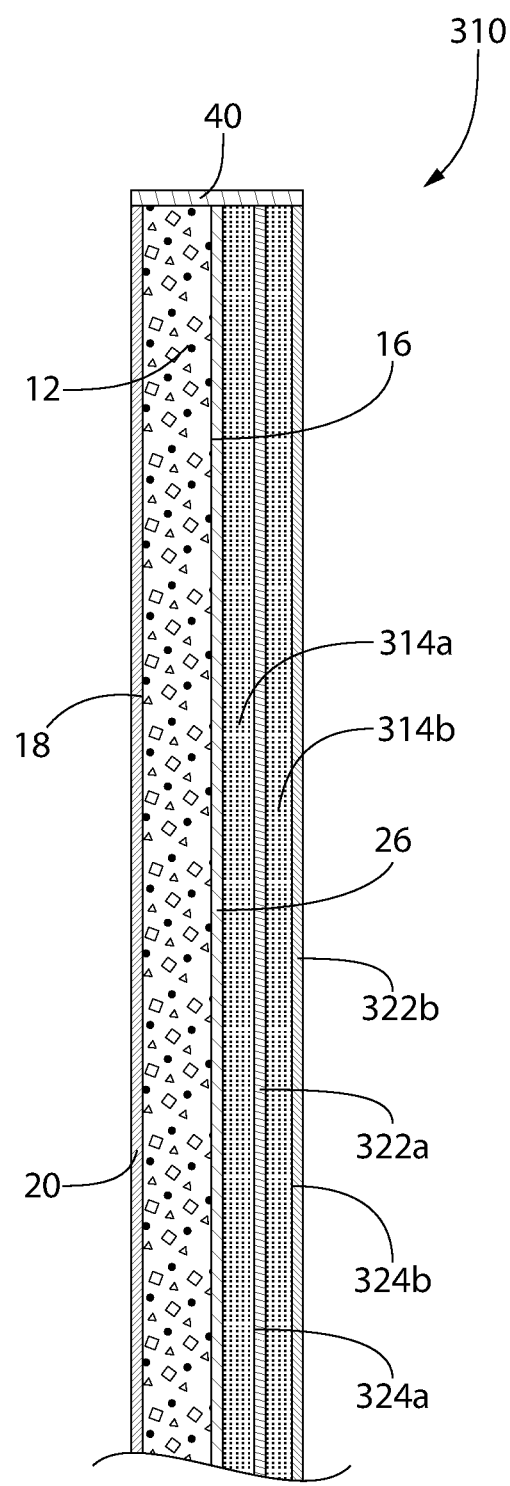
FIG. 7 is a cross sectional view of a sound damping wallboard in accordance with aspects of the present disclosure.

Referring to FIG. 7, an example of a sound damping wallboard 310 having two layers of sound damping materials is shown. The sound damping wallboard 310 generally comprises a gypsum layer 12 having an outer surface 18 and an inner surface 16, with a first encasing layer 20 and a third encasing layer 26 respectively disposed thereon, as previously described. A first sound damping layer 314a is disposed at inner surface 16 and may be applied or positioned directly on the gypsum layer 12 or the third encasing layer 26, or both. In one embodiment, the third encasing layer 26 only partially covers the gypsum layer inner surface 16 of the gypsum layer 12, such that the sound damping layer 314a is applied or positioned on both the gypsum layer 12 and the third encasing layer 26. The first sound damping layer 314b preferably covers substantially the entire inner surface 16 of the gypsum layer 12 and/or the third encasing layer 26. In a further preferred embodiment, the sound damping layer 314a is a monolithic, homogenous layer. Sound damping layer 314a has an inner surface 324a opposite the gypsum layer 12. A second encasing layer 322a may be applied or positioned on inner surface 324a of the first sound damping layer 314a, in the same manner as previously described.

A second sound damping layer 314b is disposed at inner surface 324a of first sound damping layer 314a, and may be applied or positioned directly on the first sound damping layer 314a or the second encasing layer 322a, or both. In one embodiment, the second encasing layer 322a only partially covers the first sound damping layer 314a, such that the second sound damping layer 314b is applied or positioned on both the first sound damping layer and second encasing layer. In an alternative embodiment, the second encasing layer 322a is omitted and the second sound damping layer 314b is applied or positioned directly on the first sound damping layer 314a, without an encasing layer between the sound damping layers. The second sound damping layer 314b preferably covers substantially the entire inner surface 324a of the first sound damping layer 314a and/or the second encasing layer 322a. In a further preferred embodiment, the second sound damping layer 314b is a monolithic, homogenous layer. Second sound damping layer 314b has an inner surface 324b opposite the first sound damping layer 314a. A fourth encasing layer 322b may be applied or positioned on inner surface 324b of the second sound damping layer 314b.

Sound damping wallboard 310 may also include a first edge encasing layer 40 and a second edge encasing layer (not shown), that extend across one or more of first encasing layer 20, third encasing layer 26, second encasing layer 322a and/or fourth encasing layer 322b. In a preferred embodiment, sound damping wallboard 310 has first and second edge encasing layers that extend across all of the encasing layers—e.g., extend from first edge encasing layer 40 to fourth encasing layer 322b.

The encasing layers 20, 26, 322a and 322b may also comprise the same or different materials and, in particular, may comprise materials of different densities. In a particular embodiment, the (outermost) fourth encasing layer 32b may comprise a different material than the second and/or third encasing layers (322a, 26). For example, the outermost encasing layer may comprise a carrier sheet, such as a "peel & stick" layer, where the carrier sheet may be removed from the sound damping wallboard during manufacture or installation. In one embodiment, (outermost) sound damping layer 314b may comprise a tacky or adhesive material, and (outermost) encasing layer 322b may comprise a peel & stick carrier sheet. On installation, encasing layer 322b may be removed and adhesive sound damping layer 314b applied to an existing wall or ceiling, as previously described. In a preferred embodiment, all of the encasing layers (e.g., 20, 26, 322a and 322b) are all made of paper.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

Example 1

A sound damping wallboard was prepared comprising a ¼ inch gypsum layer and an Acronal® sound damping layer. A paper facing or encasing layer was disposed on either side of the sound damping wallboard and between the gypsum and sound damping layers. The sound damping wallboard was then attached or retrofit to a conventional ⅝ inch wallboard, as described above using standard gypsum wallboard fasteners. The retrofit sound damping wallboard was tested for sound transmission loss in a full scale wall test according to the ASTM E-90 standard. The results were compared to a control wallboard without the retrofit sound damping wallboard. The sound transmission loss in decibels (dB) was measured at various frequencies, as shown in Table 1 and FIG. 5.

TABLE 1

| Frequency (Hz) | Sound Transmission Loss (dB) | | | |
|---|---|---|---|---|
| | Control (CW) | Retrofit (SDW) | Difference | % Increase |
| 100 | 17 | 22 | 5 | 29.4 |
| 125 | 13 | 19 | 6 | 46.2 |
| 160 | 13 | 15 | 2 | 15.4 |
| 200 | 17 | 22 | 5 | 29.4 |
| 250 | 23 | 27 | 4 | 17.4 |
| 315 | 23 | 27 | 4 | 17.4 |
| 400 | 29 | 34 | 5 | 17.2 |
| 500 | 32 | 35 | 3 | 9.4 |
| 630 | 34 | 37 | 3 | 8.8 |
| 800 | 38 | 40 | 2 | 5.3 |
| 1000 | 40 | 43 | 3 | 7.5 |
| 1250 | 42 | 47 | 5 | 11.9 |
| 1600 | 44 | 50 | 6 | 13.6 |
| 2000 | 43 | 51 | 8 | 18.6 |
| 2500 | 36 | 48 | 12 | 33.3 |
| 3150 | 34 | 48 | 14 | 41.2 |
| 4000 | 38 | 50 | 12 | 31.6 |
| 5000 | 43 | 52 | 9 | 20.9 |

Figure 5:
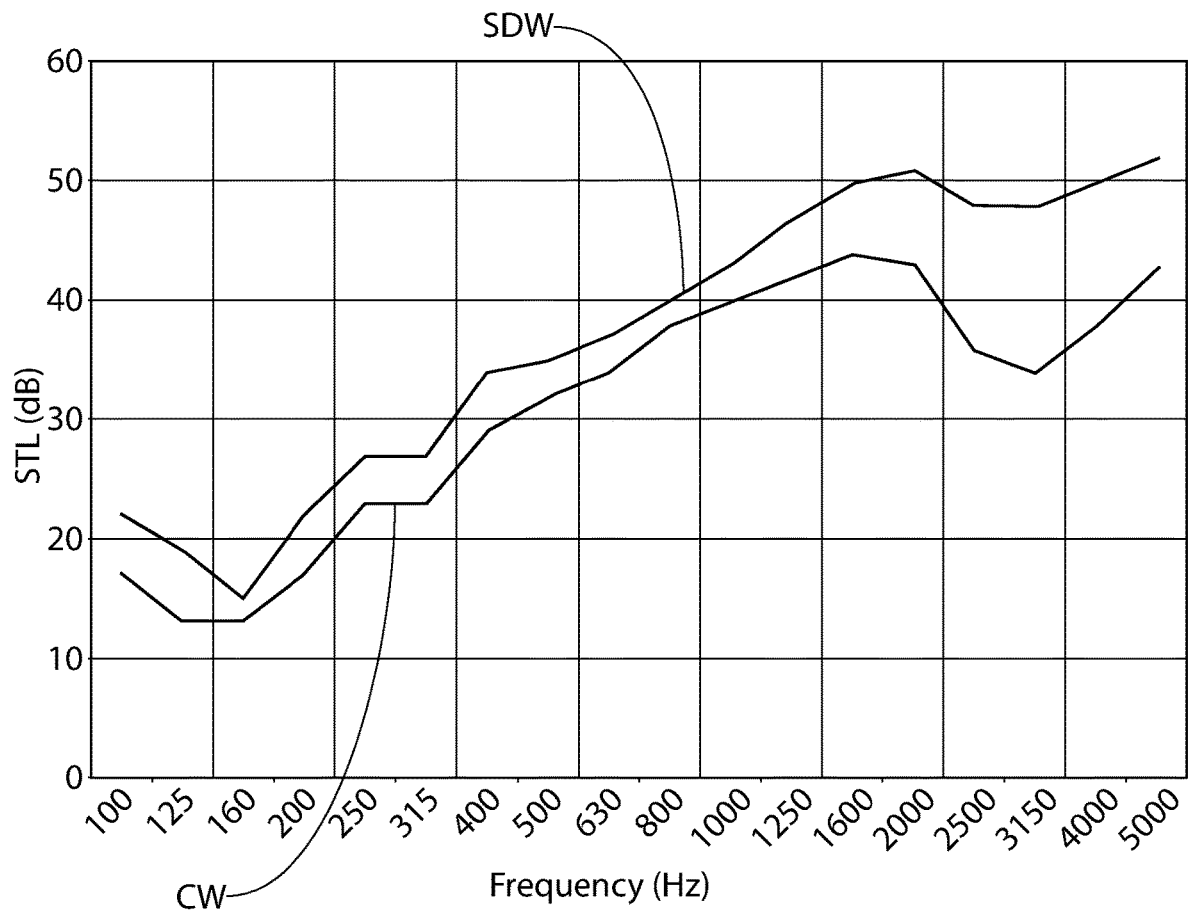
FIG. 5 is a data plot of frequency and sound transmission loss, that illustrates the performance of a sound damping wall in accordance with further aspects of the present disclosure.

As illustrated in the chart of FIG. 5, the sound damping wallboard 10 with the sound damping layer 14 provides enhanced acoustical performance in the Hertz ranges from 100 Hz to 5000 Hz. The sound transmission loss value of the sound damping wallboard 10 with sound damping layer 14, indicated by the line SDW, is substantially higher than a sound transmission loss value of a standard, non-damping control wallboard, indicated by the line CW. In particular, the retrofit sound damping wallboard 10 with the sound damping layer 14 of the embodiment of FIG. 5 provides improved acoustical performance, particularly in the Hertz range from 1250 Hz to 5000 Hz.

Example 2

Four test walls (Walls 1-4) utilizing different density materials were prepared and tested for acoustical performance. The walls were constructed of ⅝ inch gypsum wallboard over steel studs and insulation, and were assembled using conventional construction techniques. Except as noted, the gypsum wallboard comprised a conventional density gypsum layer and was commercially available as Gold Bond® Fire-Shield® Gypsum Board (National Gypsum Company, Charlotte, N.C.).

Wall 1 was constructed with a ⅝ inch gypsum wallboard on each side of the wall assembly. Wall 2 was constructed with two ⅝ inch gypsum wallboards on the first side of the wall assembly, and one ⅝ inch gypsum wallboard on the second side of the wall assembly. Wall 3 was constructed with a ⅝ inch gypsum wallboard and a ⅝ inch sound damping wallboard on the first side of the wall assembly, and one ⅝ inch gypsum wallboard on the second side of the wall assembly. The sound damping wallboard of Wall 3 comprised an Acronal® sound damping layer sandwiched between two ¼ inch gypsum boards having higher density gypsum layers. Wall 4 was constructed with a ⅝ inch gypsum wallboard and a ¼ inch sound damping wallboard on the first side of the wall assembly, and one ⅝ inch gypsum wallboard on the second side of the wall assembly. The sound damping wallboard of Wall 4 comprised an Acronal® sound damping layer applied to a single ¼ inch gypsum board having a higher density gypsum layer.

Figure 6:
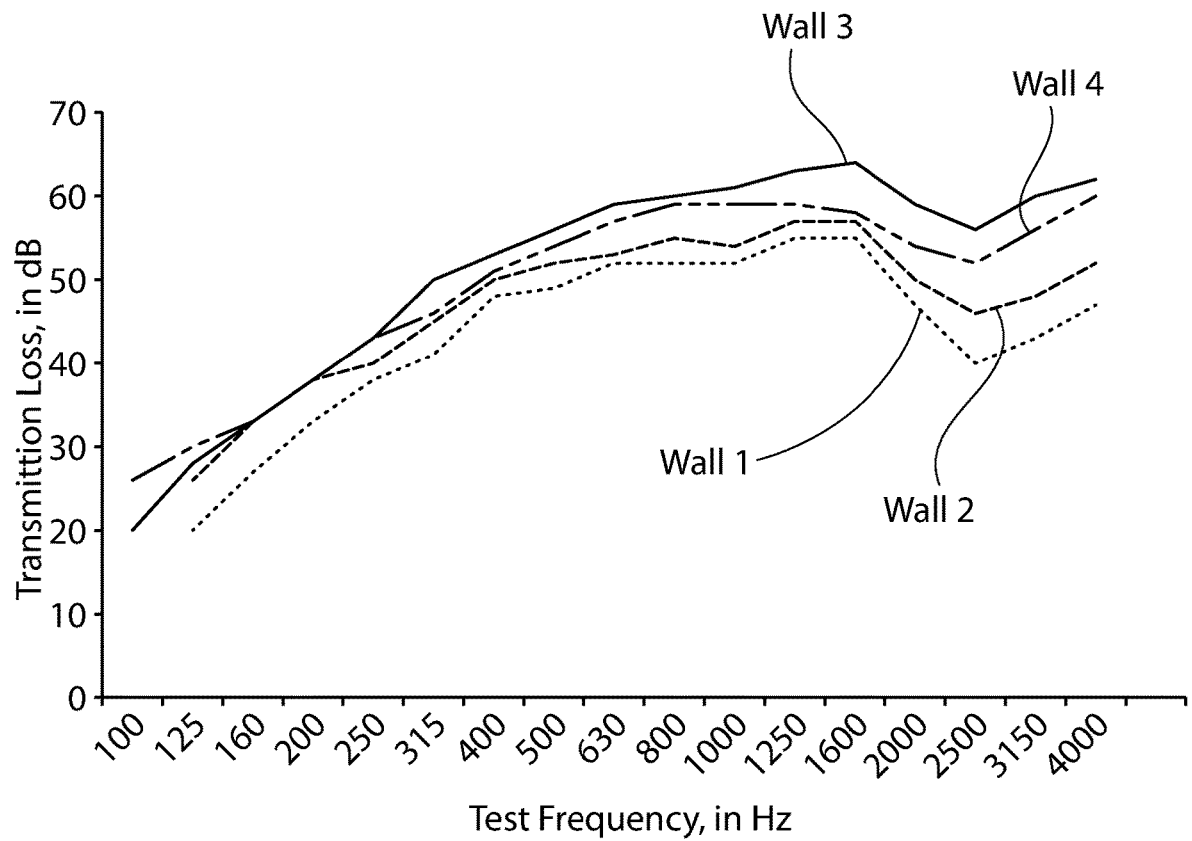
FIG. 6 is a data plot of frequency and sound transmission loss, that illustrates the performance of alternative embodiments of a sound damping wall in accordance with further aspects of the present disclosure.

Walls 1-4 were tested for sound transmission loss in a full scale wall test according to the ASTM E-90 standard. The sound transmission loss in decibels (dB) was measured at various frequencies, as shown in Table 2 and FIG. 6. As shown in FIG. 6, the retrofit addition of a sound damping wallboard (Walls 3, 4) was found to provide significant improvement in sound transmission loss over conventional construction Wall (1) or the use of two conventional wallboard panels (Wall 2). Furthermore, the sound damping wallboards comprising two gypsum boards (Wall 3) and only one gypsum board (Wall 4) were found to fall within the same STC rating.

TABLE 2

| Frequency (Hz) | Sound Transmission Loss (dB) | | | |
|---|---|---|---|---|
| | Wall 1 | Wall 2 | Wall 3 | Wall 4 |
| 100 | — | — | 20 | 26 |
| 125 | 20 | 26 | 28 | 30 |
| 160 | 27 | 33 | 33 | 33 |
| 200 | 33 | 38 | 38 | 38 |
| 250 | 38 | 40 | 43 | 43 |
| 315 | 41 | 45 | 50 | 46 |
| 400 | 48 | 50 | 53 | 51 |
| 500 | 49 | 52 | 56 | 54 |
| 630 | 52 | 53 | 59 | 57 |
| 800 | 52 | 55 | 60 | 59 |
| 1000 | 52 | 54 | 61 | 59 |
| 1250 | 55 | 57 | 63 | 59 |
| 1600 | 55 | 57 | 64 | 58 |
| 2000 | 47 | 50 | 59 | 54 |
| 2500 | 40 | 46 | 56 | 52 |
| 3150 | 43 | 48 | 60 | 56 |
| 4000 | 47 | 52 | 62 | 60 |

In this regard, the sound transmission loss for a wall assembly including the sound damping wallboard as disclosed herein may be 1% or more, such as 2% or more, such as 5% or more, such as 10% or more, such as 15% or more, such as 20% or more, such as 30% or more than the sound transmission loss for a wall assembly not including a sound damping layer as disclosed herein. Such comparison may be at any frequency and in particular at a frequency of 500 Hz or more, such as 1000 Hz or more, such as 2000 Hz or more, such as 2500 Hz or more, such as 4000 Hz or more. In particular, such comparison may be at 500 Hz, such as at 1000 Hz, such as at 2000 Hz, such as at 2500 Hz, such as at 4000 Hz. In addition, such comparison may be at any 2, such as at any 3, such as at any 4, such as at any 5 of the aforementioned frequencies.

In addition, at a frequency of 1000 Hz, the sound transmission loss of the sound damping wallboard as disclosed herein may be 55 dB or more, such as 56 dB or more, such as 57 dB or more, such as 58 dB or more, such as 60 dB or more. At a frequency of 2000 Hz, the sound transmission loss of the sound damping wallboard as disclosed herein may be more than 50 dB, such as 51 dB or more, such as 52 dB or more, such as 53 dB or more, such as 55 dB or more, such as 57 dB or more. At a frequency of 4000 Hz, the sound transmission loss of the sound damping wallboard as disclosed herein may be more than 52 dB, such as 53 dB or more, such as 55 dB or more, such as 57 dB or more, such as 59 dB or more, such as 60 dB or more.

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

The invention claimed is:

1. A sound damping wallboard, comprising:
    a gypsum layer having a gypsum layer outer surface and a gypsum layer inner surface opposite the gypsum layer outer surface;
    a first encasing layer disposed at the gypsum layer outer surface wherein the first encasing layer includes paper;
    a first sound damping layer disposed at the gypsum layer inner surface and having a first sound damping layer surface opposite the gypsum layer;
    a second sound damping layer disposed at the first sound damping layer surface and having a second sound damping layer surface opposite the first sound damping layer;
    a second encasing layer disposed at the first sound damping layer surface;
    a third encasing layer disposed at the gypsum layer inner surface;
    a fourth encasing layer disposed at the second sound damping layer surface wherein the fourth encasing layer includes paper, fiberglass, foil, or a polymer; and
    a first edge encasing layer present on an edge of the sound damping wallboard, wherein the first edge encasing layer connects the first encasing layer and the fourth encasing layer, wherein the first edge encasing layer is formed of a material selected from the group consisting of paper, fiberglass, and foil.

2. The sound damping wallboard of claim 1, wherein the first sound damping layer is positioned on the third encasing layer.

3. The sound damping wallboard of claim 1, wherein the second sound damping layer is positioned on the second encasing layer.

4. The sound damping wallboard of claim 1, wherein the first and second sound damping layers comprise different sound damping materials.

5. The sound damping wallboard of claim 1, wherein the first and second sound damping layers have different thicknesses.

6. The sound damping wallboard of claim 1, wherein the first and second sound damping layers include the same polymer wherein the first and second sound damping layers include different additives wherein the additive in the first sound damping layer has a different density than the additive in the second sound damping layer.

7. The sound damping wallboard of claim 1, wherein the first sound damping layer, the second sound damping layer, or both include an acrylic polymer or copolymer.

8. The sound damping wallboard of claim 1, wherein the second encasing layer includes paper.

9. The sound damping wallboard of claim 1, wherein the sound damping wallboard exhibits a sound transmission loss of 20% or more in comparison to a wallboard without a sound damping layer.

10. The sound damping wallboard of claim 1, wherein the first edge encasing layer further connects the first sound damping layer, the second sound damping layer, the second encasing layer, and the third encasing layer individually or in combination.

11. The sound damping wallboard of claim 10, wherein the first edge encasing layer connects five or more layers.

12. The sound damping wallboard of claim 1, wherein the first sound damping layer, the second sound damping layer, or both are a homogenous layer.

13. A sound damping wallboard, comprising:
    a gypsum layer having a gypsum layer outer surface and a gypsum layer inner surface opposite the gypsum layer outer surface;
    a first encasing layer disposed on the gypsum layer outer surface wherein the first encasing layer includes paper;
    a first sound damping layer having a first sound damping layer surface opposite the gypsum layer;
    a second encasing layer disposed on the first sound damping layer surface;
    a third encasing layer disposed on the gypsum layer inner surface wherein the first sound damping layer is positioned on the third encasing layer;
    a second sound damping layer positioned on the second encasing layer, and having a second sound damping layer surface opposite the first sound damping layer;
    a fourth encasing layer disposed on the second sound damping layer surface wherein the third encasing layer comprises paper, fiberglass, foil, or a polymer; and
    a first edge encasing layer present on an edge of the sound damping wallboard, wherein the first edge encasing layer connects the first encasing layer and the fourth encasing layer, wherein the first edge encasing layer is formed of a material selected from the group consisting of paper, fiberglass, and foil.

14. The sound damping wallboard of claim 13, wherein the fourth encasing layer comprises a different material than the first and second encasing layers.

15. A method of installing the sound damping wallboard of claim 13 on installed wallboard, the method comprising:

attaching the sound damping wallboard onto the installed wallboard wherein the first sound damping layer is positioned between the gypsum layer and the installed wallboard.

16. The method of claim 15, wherein the gypsum layer of the sound damping wallboard has a density that is higher than a density of the installed wallboard.

17. A method of forming a sound damping wallboard, the method comprising:
providing a first encasing layer;
forming a gypsum layer on the first encasing layer, the gypsum layer having a gypsum layer outer surface on the first encasing layer and a gypsum layer inner surface opposite the gypsum layer outer surface;
providing a third encasing layer at the gypsum layer inner surface wherein the third encasing layer comprises paper;
providing a first sound damping layer on the third encasing layer wherein the first sound damping layer has a first sound damping layer inner surface opposite the gypsum layer inner surface;
providing a second encasing layer at the first sound damping layer inner surface;
providing a second sound damping layer on the second encasing layer wherein the second sound damping layer has a second sound damping layer inner surface opposite the first sound damping layer inner surface;
providing a fourth encasing layer at the second sound damping layer inner surface wherein the fourth encasing layer includes paper, fiberglass, foil, or a polymer; and
providing a first edge encasing layer, wherein the first edge encasing layer is present on an edge of the sound damping wallboard, wherein the first edge encasing layer connects the first encasing layer and the fourth encasing layer, wherein the first edge encasing layer is formed of a material selected from the group consisting of paper, fiberglass, and foil.

18. The method of claim 17, wherein the providing the first sound damping layer includes applying a precursor solution containing a polymer.

19. The method of claim 18, wherein the method further comprises drying the precursor solution to provide the first sound damping layer.

* * * * *